July 3, 1956 P. P. M. DUBOSCLARD 2,753,244
MILLING MACHINE
Filed Dec. 7, 1951 4 Sheets-Sheet 1

INVENTOR.
PAUL P.M. DUBOSCLARD,
BY
ATTORNEY.

July 3, 1956     P. P. M. DUBOSCLARD     2,753,244

MILLING MACHINE

Filed Dec. 7, 1951     4 Sheets-Sheet 2

PAUL P.M. DUBOSCLARD,
INVENTOR.

BY

ATTORNEY.

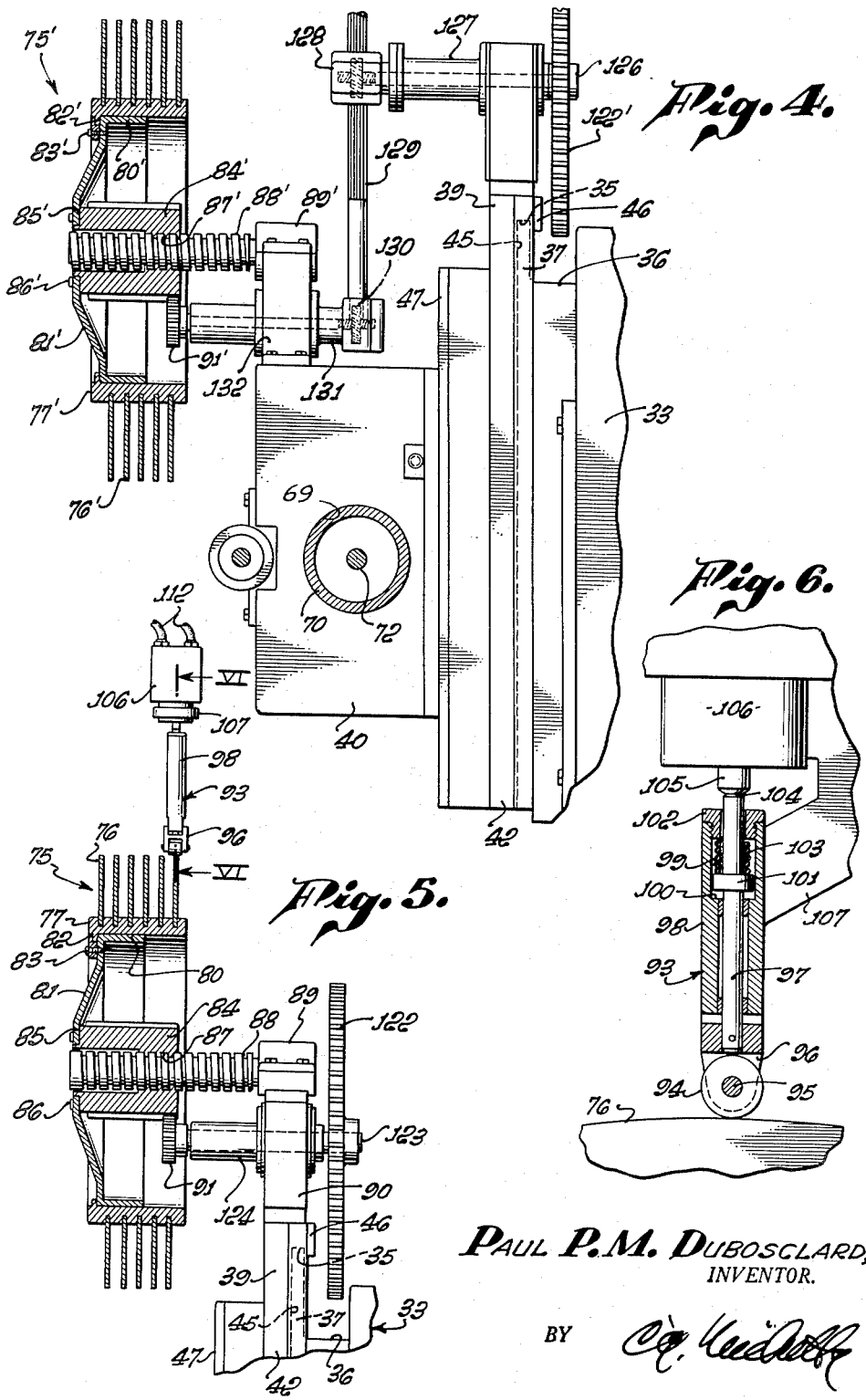

July 3, 1956 P. P. M. DUBOSCLARD 2,753,244
MILLING MACHINE
Filed Dec. 7, 1951 4 Sheets-Sheet 4
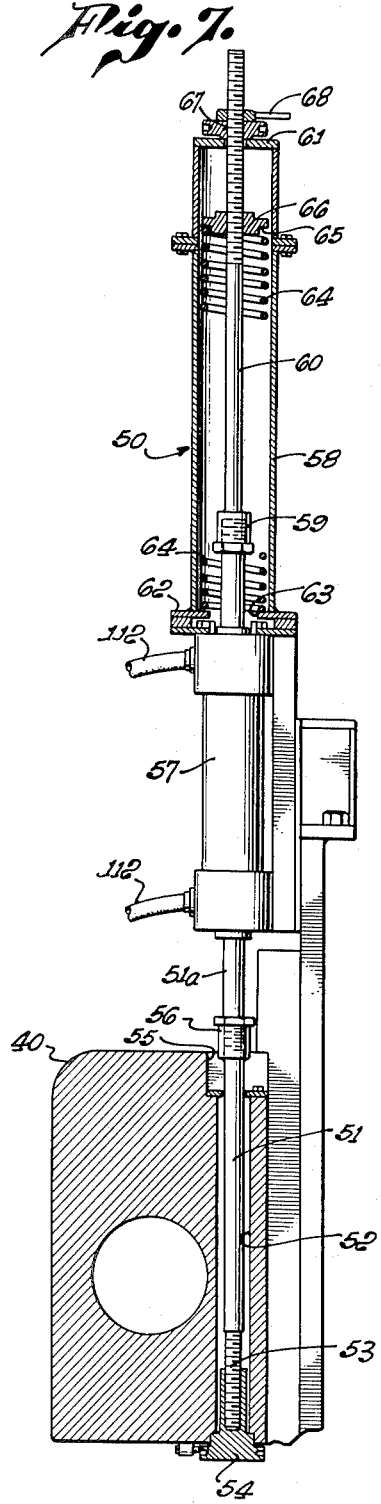
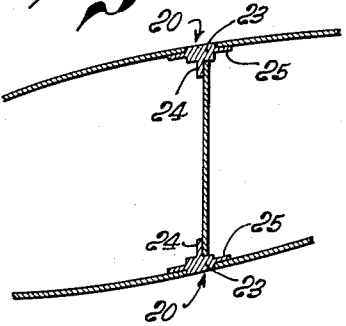
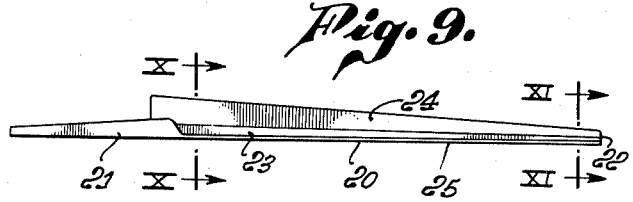
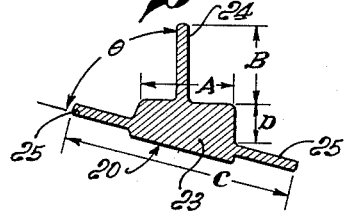
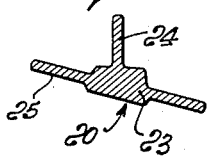
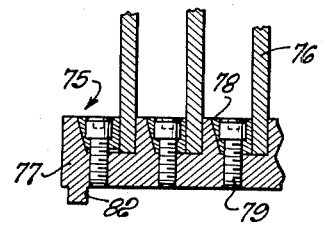
PAUL P.M. DUBOSCLARD,
INVENTOR.
BY
ATTORNEY.

United States Patent Office 2,753,244
Patented July 3, 1956

2,753,244

MILLING MACHINE

Paul P. M. Dubosclard, Topanga, Calif., assignor to Wiesner-Rapp Company, Inc., Buffalo, N. Y., a corporation of New York Application December 7, 1951, Serial No. 260,420

20 Claims. (Cl. 90—13)

This invention relates to a milling machine and more particularly to a machine for high-speed milling of spar caps used in aircraft wing construction and provided with novel cam means for controlling the path of milling cutters.

Prior-proposed spar milling machines were satisfactory in operation for cutting spar caps from a solid bar of metal in accordance with spar cap designs specified for wing construction during World War II and immediately thereafter. Since then, the rapid progress of aeronautical design has presented new spar milling problems arising out of wing design and construction for planes reaching and passing the speed of sound. Such wing construction specifies a more complex and more complicated spar cap design.

Of the new milling problems presented by such new spar cap designs, one problem includes the cutting of a warped or twisted surface with two-dimensional movement of the cutters, maintained in perpendicular relation in planes perpendicular to the path of advancement of the cutters while turning the cutters about the axis of advancement, the two-dimensional movements of the cutters being maintained in constant, unchanging, angular relationship to the twisted surface being formed. A second problem is that of reducing idle or nonproductive time on a high-speed milling machine, such idle time occurring during change of cam templates on the machine from one spar cap design to a different spar cap design.

Prior-proposed spar milling machines included a fixed bed of long length, for example forty to eighty feet. A workpiece of desired length was rigidly clamped to the fixed bed. One or more self-propelled carriages moved along said bed and each carried milling cutters which were capable of moving up and down with respect to the workpiece. Cutter movements were controlled by long fabricated templates bolted to the side of the fixed bed and having selected cam surfaces along which cam followers traveled for transmitting desired movement to the cutters. The length of each template was generally equivalent to the length of the workpiece and was usually made up of a plurality of adjacent template sections. In such prior machines, up and down movement of the cutter was always perpendicular to the top surface of the fixed bed and not normal to a twisted surface being formed. In and out cutter movements were not practicable in the prior art.

The long fabricated template of prior constructions required time-consuming, change-over periods. Such long idle time periods were unavoidable because bolting of the sectional template to the bed had to be accurately performed and checked before a milling operation could begin. Obviously, slight mislocation of one template section would result in mislocation of the following and adjacent template sections and the finished product would be necessarily rejected as not conforming to specifications.

The main object of this invention is to design and provide an improved spar milling machine which substantially solves the two problems mentioned above.

An object of this invention is to design and provide a high-speed spar cap milling machine for cutting a warped or twisted surface while maintaining two-dimensional perpendicularly related movement of the cutters in constant, unchanging relationship to the warped surface being milled.

An object of this invention is to design and provide a high-speed spar cap milling machine wherein compact cam template means capable of being handled as a unit and drive means therefor are provided for reducing to a minimum nonproductive change-over time of the machine.

A further object of this invention is to design and provide a spar milling machine wherein portable, unitary cam template means, each having a continuous cam edge of the length of the workpiece, are mounted upon a self-propelled carriage.

Still another object of this invention is to design and provide a spar milling machine wherein cutter mounting means are driven by cam template means removably supported from the carriage and driven by the carriage driving means.

This invention contemplates an improved spar milling machine wherein the cam means for controlling movement of the cutters includes a helical template having a continuous edge virtually the length of the work piece to be cut and supported from the carriage.

A still further object of this invention is to design and provide for an improved spar milling machine as described above a helical template means capable of being removably carried by a cradle plate adapted to be rotated about the axis of the work piece.

Generally speaking, this invention contemplates a spar milling machine having a fixed bed provided with means for rigidly clamping a work piece to said bed and ways for movement of a self-propelled carriage longitudinally along said bed. On one face of the carriage is provided a partially circular way upon which may be mounted for partial rotation a cradle plate. The cradle plate carries a pair of sleeve blocks slidably mounted thereon for up and down movement, said blocks being normally disposed on opposite sides of the axis of a work piece. Each block is transversely bored for slidably mounting a milling head for in and out movement with respect to a workpiece. Removably mounted cam means are supported from the carriage, each comprising a helical cam template adapted to be rotated and axially moved by the drive means of the carriage in such a manner that a continuous helical outer cam edge contacts a cam follower mounted on the cutter supporting member. Each cam follower may be associated with power amplifying means, such as hydraulic means, for transmitting responses of the cam follower to a cooperable power amplifier for controllably moving a cutter in desired direction. The support of cam means from a cradle plate which is rotatably mounted on the carriage with its center at approximately the center of the workpiece provides an arrangement whereby up and down movement and in and out movement of the cutter may be maintained in constant relationship to a twisted or warped surface being milled. The removable cam templates may be handled as a unit and may be readily stored in undisturbed assembled relationship for future use. Since the helical cam templates are readily mounted on the carriage, the idle time for a change over is reduced to a minimum.

Other objects and advantages of this invention will be readily apparent from the following description of the drawings.

In the drawings:

Fig. 4 is a fragmentary enlarged side view of cutter mounting means showing drive means for a cam means which controls in and out movement of a cutter.

Fig. 5 is a fragmentary enlarged view of a drive means and cam means which controls up and down movement of a cutter.

Fig. 6 is an enlarged fragmentary sectional view of a cam follower taken in the plane indicated by line VI—VI of Fig. 5.

Fig. 7 is an enlarged fragmentary sectional view showing a counterbalancing means for a sleeve block adapted to rise and fall.

Fig. 8 is a diagrammatic view showing in section a portion of a wing structure to illustrate employment of spar caps.

Fig. 9 is a diagrammatic side view of a normal spar cap.

Fig. 10 is a sectional view of the spar cap shown in Fig. 9, the section being taken in the transverse plane indicated by line X—X of Fig. 9.

Fig. 11 is a sectional view taken in the plane XI—XI of Fig. 9.

Fig. 12 is a fragmentary enlarged view of a method of mounting template portions for forming a helical cam template.

Figure 1:
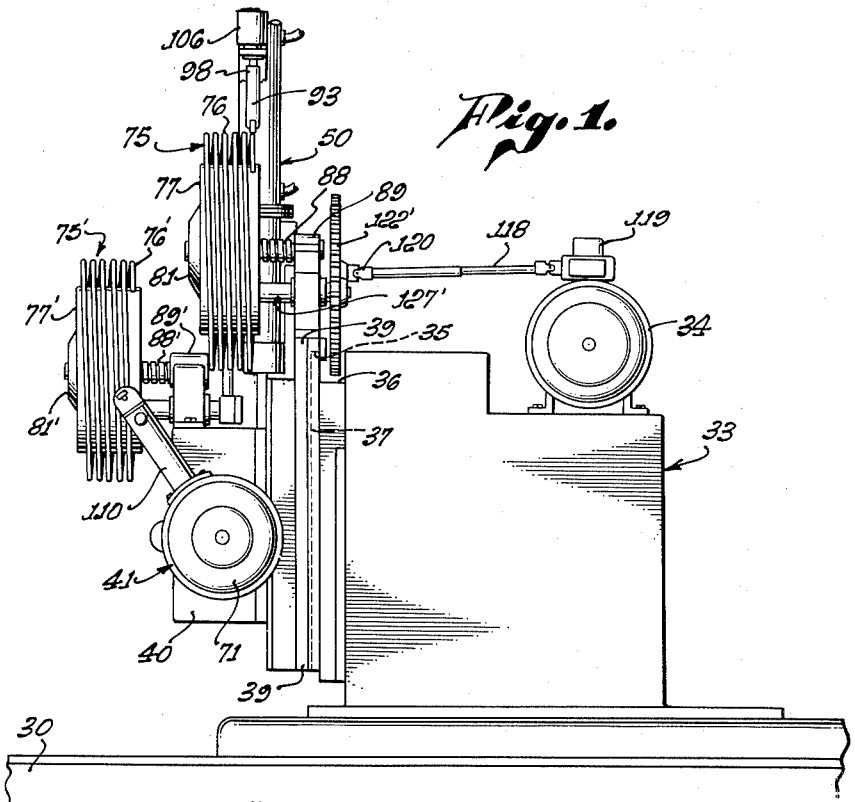
Fig. 1 is a side view of a carriage of a spar milling machine embodying this invention.

For purposes of explanation, the purpose of the spar milling machine embodying this invention can best be understood by first referring to Figs. 8, 9, 10 and 11. A typical spar cap 20 tapers generally from end 21, which is positioned adjacent to a supporting fuselage, to end 22 which is located adjacent to a wing tip. The cross-section of said spar cap 20 may vary as indicated in Figs. 10 and 11. In general, the spar cap may include an elongated body portion 23 of polygonal cross-section, a generally vertically extending web 24, and sidewardly extending skin attaching portions 25 disposed in angular relation to the web as indicated by angle "$\theta$". The angle "$\theta$" may vary throughout the length of the spar cap. Other variable dimensions subject to change in spar cap design are indicated by the letters A, B, C, and D. The thickness of the web 24 and portions 25 may generally be constant and likewise the width of portions 25 may be constant. The spar milling machine of this invention provides for cutter movement arranged and controlled for a milling operation while varying the angle "$\theta$" and the several variable dimensions as described above.

Figure 2:
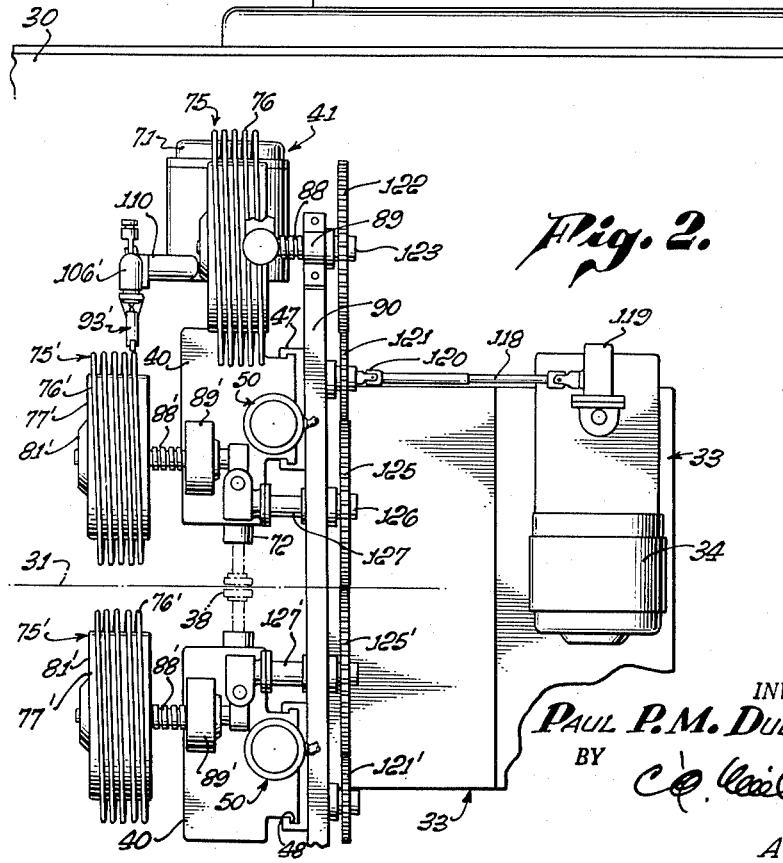
Fig. 2 is a fragmentary top view of the carriage shown in Fig. 1, the lower half of Fig. 2 being broken away because it is identically constructed as the upper half.
Figure 3:
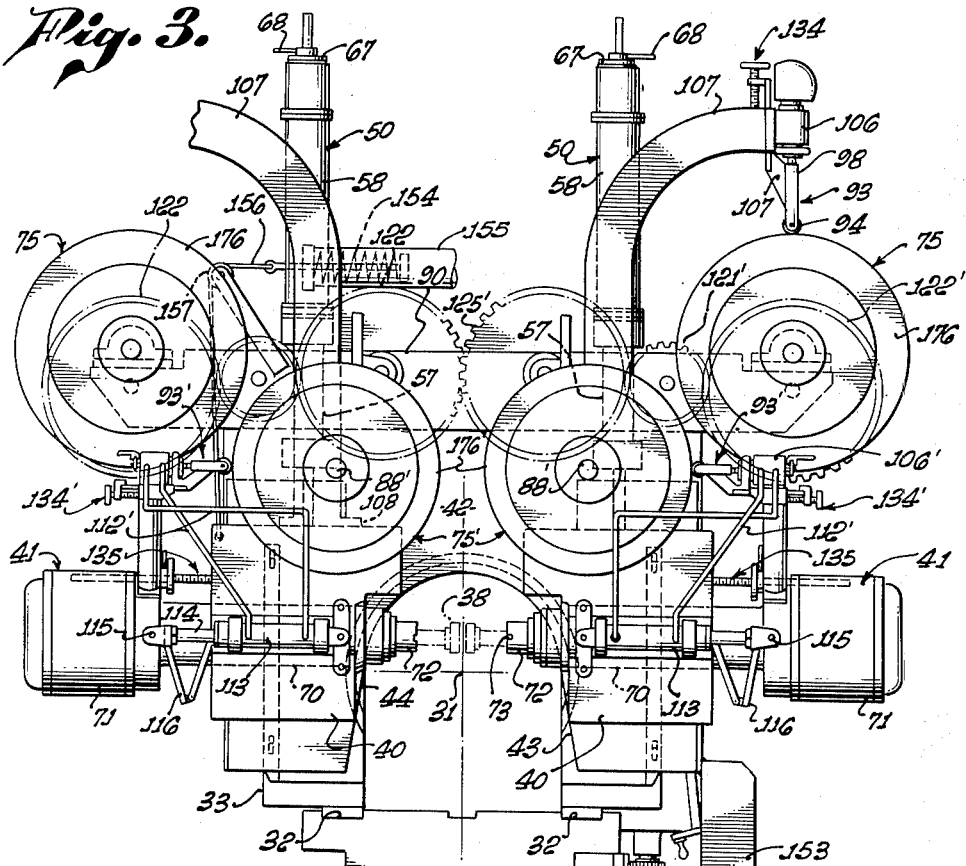
Fig. 3 is an end view taken from the left of Fig. 2.
Figure 13:
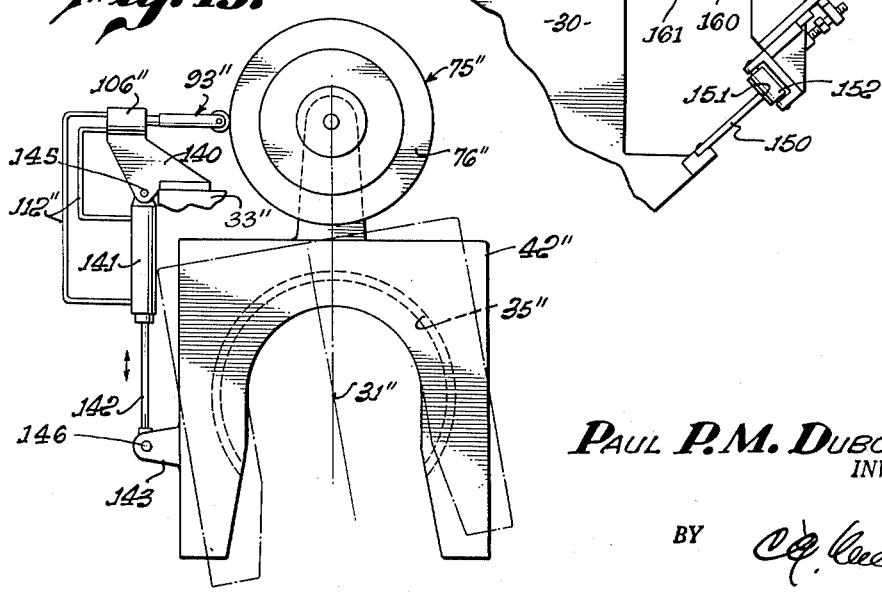
Fig. 13 is a diagrammatic view illustrating the employment of a cam means supported by the carriage for controlling twist of the cutters or rotation of the cradle plate through selected angles.

In the embodiment of the invention shown in Figs. 1 to 3, only means for controlling the movement of cutters in an up and down motion and an in and out motion are shown for purposes of clarity. Means for moving the cutters about an angle are illustrated in Fig. 13 and will be described separately. It is understood, of course, that a spar milling machine may be made employing the cutter mounting means shown in Figs. 1 to 3 to solve the first mentioned problem relating to milling twisted surface while providing a cam template fixed along the bed of the machine for controlling the movement of the cutters in angular relationship to the fixed bed.

The spar milling machine illustrated includes a fixed elongated bed 30 of suitable length for milling a spar cap of selected length. The length may extend, for example, to 80 feet or more. The fixed bed may be provided with suitable means for rigidly clamping a workpiece to said bed with the axis of the workpiece located generally at 31. The bed 30 may be provided with longitudinally extending parallel ways 32 upon which may slide one or more self-propelled carriages, one carriage being generally indicated at 33. Each carriage is provided with propelling or driving means such as a motor 34 mounted upon the carriage. The motor 34 may be suitably connected to a vertically arranged pinion 160 (Fig. 3) which meshes with a horizontally arranged rack 161 carried by and fixed to one side of the bed 30.

In the example shown, one face of the carriage is provided with a partially circular way 35 having the center of the circle generally coincident with axis 31 of the clamped work piece. The circular way 35 may be formed by partially circular recess 36 provided in the face of the carriage to define a radially outwardly directed partially circular flange 37 spaced outwardly from the carriage and encompassing more than 180° and less than 270°, the flange 37 extending to lower side portions of the carriage.

Means for mounting a cutter, diagrammatically indicated at 38 (Fig. 3) for rotatable movement about axis 31 may include a cradle plate 39 mounted on said flange 37. Means for mounting the cutter for two dimensional perpendicularly related movements; that is, generally up and down and in and out movements, may include a sleeve block 40 vertically slidable on the cradle plate and a milling head 41 transversely slidable in the block 40. The cutter mounting means therefor includes the cradle plate 39, the sleeve block 40 and the milling head 41, all being associated for relative movement with respect to each other and all being supported from the carriage.

The cradle plate 39 may comprise a flat, generally rectangular plate 42 of thick section having a downwardly facing opening 43 corresponding generally to a downwardly facing longitudinally extending opening 44 provided in the bottom portion of the carriage to accommodate the workpiece as the carriage moves along the bed. The inner face of the cradle plate 42 may be partially circularly recessed as at 45 to correspond with the outer face of the flange 37. Around the circumference of recess 45 on the cradle plate is provided a rearwardly extending and radially inwardly turned lip 46 for cooperative engagement with outer margins of flange 37 for permitting rotation of the cradle plate upon circular way 35.

An exemplary means for moving the cutters angularly about an axis of the workpiece is shown in Fig. 3. An outwardly and upwardly inclined cam template 150 may be supported along one side of the fixed bed 30. Cam edge 151 of the template is cooperably engaged by a cam roller 152 rotatably mounted at one end of suitable adjusting means carried by rigid arm 153 which is secured to the cradle plate 39.

Means for biasing said roller against the cam edge so that the roller will accurately respond to the configuration of cam edge, may be provided by a spring 154 carried within a cylinder 155 mounted on the carriage in any suitable manner. A flexible chain 156 associated with one end of the spring by a spring cap (not shown) travels over a pulley 157 for connection at its other end to a suitable point on the side of the cradle plate. The spring thus positively urges the roller against the cam edge so that changes in configuration of said edge are directly transmitted to the cradle plate for selectively turning the plate about an axis of the workpiece.

The outer face of the cradle plate 42 on each side of axis 31 of the workpiece may be provided with a vertical way 47 upon which is slidably mounted as at 48 a sleeve block 40.

The block 40 may be formed of a heavy block of metal principally supported by one or more counterbalancing means of spring type as indicated at 50. Block 40 may be carried on said way 47 by a supporting rod 51 which extends through a vertical bore 52 in the rear portion of said block for threaded connection as at 53 with a bottom adjustable headed sleeve member 54. The top of bore 52 may be enlarged as at 55 to afford space for an internally threaded collar 56 welded to the upper end of rod 51. Manual adjustment of the block 40 upon said way 47 may thus be made by turning sleeve member 54.

Threaded in collar 56 is the lower end of a piston rod 51a which extends upwardly through an intermediate hydraulic cylinder 57, the operation of which will be described later, and into and through a top cylinder means 58 of counterbalancing means 50. The upper end of the rod 51a is provided threaded connection with a hollow internally threaded collar 59 secured as by welding to one end of an adjusting rod 60 of reduced diameter which extends upwardly through a port in end wall 61 of top cylinder 58. Between the top cylinder and the hydraulic cylinder 57 may be provided a flanged fitting 62 having a radially inwardly extending annular portion 63 providing a seat for the lower end of a counterbalancing coil spring 64. The spring 64 is sleeved over the upper portion of rod 51a and the major portion of rod 60 and is provided with a top seat as at 65 on an adjustable spring cap member 66 threaded to the top threaded portion of rod 60.

Upwardly of end wall 61 may be provided a nut 67 and a lock nut 68 for threaded engagement with rod 60. The spring 64 partially counterbalances the weight of the head block 40. The counterbalancing forces of said spring may be adjusted by lock nut 68 and nut 67 so as to further compress or extend coil spring 64 by axial travel of the cap member 66 on rod 60. Nut 67 and lock nut 68 provide positive stops for downward movement of the sleeve block and may be used when cutting without a template. It is understood other counterbalancing means may be utilized if desired.

The milling head 41 may include an outer tubular member 70 slidably received within a transverse bore 69. The outer end of tubular member 70 may carry a motor 71 for driving cutter 38, said motor being connected to said cutter by a spindle 72 extending through the tubular member 70. The inner end of the milling head 41 may be provided with suitable means generally indicated at 73 for mounting a cutter 38 on the spindle end.

Cam means for controlling rise and fall movement of each sleeve block 40 and in and out movement of the milling head are generally indicated respectively at 75 and 75' of Figs. 5 and 4. The cam means shown for controlling the movement of a cutter in each of these two directions are substantially similarly constructed and operated except for the configuration of the cam edge. The cam means 75 for controlling rise and fall movement of the sleeve block 40 is carried by the cradle plate 39 while the cam means 75' for controlling in and out movement of the milling head 41 is carried by the block 40. It is important to note that the cam means controlling these movements are supported from and move with the carriage. For purposes of clarity and brevity, the cam means for controlling in and out movement will be assigned like reference numerals with a prime number and only cam means 75 for controlling rise and fall movements will be described in detail.

The cam means 75 shown in Fig. 5 comprises a helical cam template 76 having an outer cam edge of a length substantially the same as the length of a spar cap to be milled. The cam template 76 may be formed from a plurality of cam template sectors, said sectors being removably attached to a hollow cylindrical drum 77 in a helical groove formed thereon by means of suitable wedges 78 and securing bolts 79 (Fig. 12). The drum 77 may be of suitable diameter and is removably carried upon an annular axially extending flanged portion 80 of a generally circular dished web 81. The drum 77 is positioned on flanged portion 80 by a radially inwardly extending rib 82 formed on the inner surface of the drum adjacent to one end. A plurality of circumferentially spaced securing lugs 83 and bolts which threadedly engage web 81 hold the drum in operative position. It will be noted that the helical cam template mounted upon drum 77 may thus be conveniently and readily removed or installed as a unit. It may be handled as a complete normally unchangeable unit for storage and operating purposes.

The web 81 may be carried on one end face of an external wide faced spur gear 84 serving as a hub for web 81. The end face of gear 84 may be provided with an outer annular recess 85 accommodating inner annular margins of web 81. Bolts 86 serve to secure the web to gear 84. The gear 84 may be provided with an internally threaded portion 87 in its axial bore for threaded engagement with a fixed nonrotatable member 88. The member 88 may be held at one end in suitable securing means 89 mounted upon a transverse member 90 carried by the top portion of cradle plate 42. The external teeth on gear 84 cooperatively mesh with a driving element or pinion gear 91 driven by the carriage drive means, as later described, for axial and rotatable movement of the cam template.

The pitch of the threads of member 88 correspond to the pitch of the helical template 76. As the pinion gear 91 rotates spur gear 84, the cam template and spur gear are axially rotatably moved along the nonrotatable fixed threaded member 88 in direct correlation to advancement of the carriage along the fixed bed.

The cam means 75 also includes a cam follower 93, the details of which are best shown in Fig. 6, directly mounted on block 40. The cam follower 93 includes a spring-biased follower wheel 94 adapted to travel along the cam edge of template 76. The wheel 94 may be carried on an axle 95 suitably journaled in a yoke 96, said yoke being carried by rod 97 which axially extends through tubular member 98. The member 98 includes an enlarged hollow chamber 99 forming a shoulder 100 limiting movement of a collar 101 on the rod 97 when rod 97 is in its lowermost position. Between collar 101 and an end cap 102 for the cylinder may be provided a coil spring 103 for resiliently supporting the follower wheel 94. The end of rod 97 projects through said end cap 102 for end to end contact as at 104 with a valve element 105 of a pilot valve 106. The pilot valve 106 may be of well known hydraulic type which is adapted to respond immediately to minute changes in the configuration of the helical cam edge as transmitted by the follower wheel.

The member 98 may be supported in fixed relation to the block 40 by a rigid support member 107 having its lower end secured to the sleeve block 40 at 108. The support member 107 is curved to support the cam follower vertically over the template 76 and to facilitate removal of the template 76. It will thus be readily noted that as the helical template is axially moved along the threaded member 88, the cam follower wheel 94 will ride along the cam edge of the template and transmit at a one to one ratio changes in configuration of the cam edge through the valve element 105 of the pilot valve 106 to the sleeve block.

It will be readily apparent from the above-description and Fig. 4 that the cam means provided for in and out movement of the milling head as indicated by reference character 75' is virtually the same as the cam means 75 just described. In cam means 75' a similar type cam follower 93' may be carried upon a forwardly and upwardly inclined arm 110 carried by milling head 41. The cam follower 93' actuates a pilot valve 106' of similar character as pilot valve 106.

The exemplary hydraulic means for transmitting responses of the pilot valves 106 and 106' are similar and well known to the art. It is understood other power amplifying means may be employed for the exemplary hydraulic system shown. For brevity the hydraulic means will be described principally with respect to the valve 106. The pilot valve 106 associated with the cam means 75 for rise and fall movement of the sleeve block may be connected by suitable conduits 112 to opposite ends of cylinder 57 for selectively admitting fluid to opposite sides of a piston head operable within the cylinder 57. The piston head is carried by rod 51a connected to the sleeve block. Since the cylinder 57 is rigidly supported on the cradle plate, a change in pressure on either side of the piston head causes the sleeve block to rise or fall, such movement returning the hydraulic system to balance. The sleeve block 40 is substantially counterbalanced by the counterbalancing means 50 previously described so that the amount of work performed by the hydraulic means is substantially reduced and the block will move in response to the action of the cam follower on the cam template.

The hydraulic means associated with pilot valve 106' includes a hydraulic follower cylinder 113 suitably mounted on the face of the sleeve block 40 with the axis of the cylinder lying parallel to and in the same horizontal plane as the axis of the tubular member of the milling head 41. The cylinder 113 encloses a piston head (not shown) and a piston rod 114 which projects therefrom for attachment at 115 to the motor casing of the milling head. As pilot valve 106' responds to the cam template 76', the piston rod 114 is moved in an axial direction so as to cause in and out movement of the milling head 41 in a manner similar to that above-described with respect to the rise and fall movement of the head block 40.

The hydraulic means for the follower system may include a reservoir for the hydraulic fluid and a continuously running pump means for supplying fluid to each pilot valve in well known manner.

A torque resisting expandable and contractable linkage 116 connects the sleeve block 40 and the milling head to prevent relative rotational movement therebetween. Means for correlating axial movement of the cam template 76 and 76' with advancement of the carriage may include a flexible extensible driven shaft 118, Fig. 1, connected by suitable gearing 119 to the drive shaft of the motor 34. The other end of shaft 118 may be connected by universal means 120 to a spur gear 121 mounted for rotation on the transverse member 90. The gear 121 meshes with a larger spur gear 122 which is fixed to shaft 123 (Fig. 5) journally mounted in a sleeve 124 carried by the transverse member 90, said shaft 123 carrying at its forward end the pinion gear 91.

The gear 121 also meshes with a gear 125 carried by a shaft 126 journally mounted in a sleeve 127 and member 90 for a movable driving connection as at 128 with a splined portion of a vertical shaft 129. The other end of shaft 129 is geared as at 130 with a shaft 131 which is journally supported as at 132 on the head block 40, the opposite end of said shaft 131 carrying a pinion gear 91' engaged with the hub gear 84' of the cam means 75'.

The drive means also includes a gear 125' having meshed engagement with the gear 125 for driving through a similar gear train the cam means 75 and 75' for the milling head and sleeve block on the opposite side of the carriage.

It will be apparent from the above description that a self-propelled carriage has been provided with cam means for controlling up and down and in and out movement of a cutter carried adjacent to the axis of a work piece. Each cam means is directly and positively correlated in its movement with the rate of advancement of the carriage through the positive gear arrangement connecting the driving motor of the carriage and the cam means. Thus, as the carriage advances, the cam template means are positively axially movable so that the response of the cam follower to the cam contour of the helical template is positively synchronized with the movement of the carriage and is immediately transmitted to the cutters through the hydraulic follower means described. Each cam template may have a selected contour different from the other cam templates for providing each cutter with selected independent movement.

While only two cutting heads are shown mounted at one end of a carriage, it will be readily understood that a plurality of cutting heads may be so mounted if desired for a particular type of milling operation. Obviously, the opposite face of the carriage may be likewise provided with cam means for controlling the movement of each cutter carried by a milling head and a head block.

Each helical template is mounted in such a manner upon the cradle plate or sleeve block that each may be readily removed without partial disassembly of other equipment. The helical template once designed and mounted upon drum 77 may be handled as a complete unit and may be readily stored when not in use without danger of changing the inter-relationship of the template portions or sectors. It will thus be obvious to those skilled in the art that a spar milling machine embodying this invention may be readily changed for cutting the design of one spar cap to the design of a different spar cap with a minimum of idle non-productive time.

Means for manual adjustment of the cam followers 93 and 93' with respect to the helical cam templates 76 and 76' are generally indicated at 134 and 134' and may be of any suitable well-known construction. Manual positioning of the sleeve block 40 with respect to rise and fall motion is provided by arrangement shown in Fig. 7 and already described. Manual positioning of the milling head 41 with respect to in and out motion of the sleeve block 40 may be provided by the adjustment means 135 of suitable well-known construction. Adjustment means 135 is employed when the in and out action is not desired, as for example when only straight cuts are to be made.

In Fig. 13 is diagrammatically illustrated an arrangement of a cam means 75" for control of the angle of rotation of a cradle plate 42" about an axis 31" of the workpiece. As mentioned above, rotation of the cradle plate may be controlled by means of a fixed template on the side of the bed as is well known in the art. In this modification a cam means similar to that described for controlling the in and out and up and down movement of a cutter is adapted to control of the angular movement of the cradle plate.

The cam means 75" includes a helical cam template 76" mounted on the carriage and provided with an outer contoured edge to selectively angularly twist the cradle plate 42" during movement of the carriage along a bed. A cam follower 93" may be supported from bracket 140 secured to the carriage 33". The mounting of the follower 93" on the bracket 140 is directly associated with a pilot valve 106" so that relative movement of the follower 93" in response to the variations in contour of the cam template will actuate pilot valve 106". The pilot valve 106" may be connected by conduits 112" to a hydraulic cylinder means 141 depending from said bracket 140 and pivotally connected thereto as at 145. The cylinder means 141 is provided with a piston rod 142 reciprocally movable therein and pivotally connected as at 146 at its outer free end to a bracket 143 mounted on the side of cradle plate 42". The cradle plate 42" is thus controlled in its relative motion with respect to the carriage by the helical cam template 76". The pilot valve 106" is of well-known form, and upon response by the follower 93" to variations in the cam contour the valve 106" produces a differential in pressure on opposite sides of the piston head in the cylinder 141 which is equalized immediately thereafter by the change in position of the cradle plate 42".

The drive means (not shown) for the helical cam template 76" may include a suitable arrangement of gear means driving through universal joints and splined shafts substantially the same as that described for cam means 75, the template being axially movable and rotatable in direct correlation with the advancement of the carriage. The helical cam template 76" is also mounted upon a drum to permit the template to be handled as a unit and readily removable.

A high speed spar milling machine embodying this invention is thus capable of milling a spar cap having a warped or twisted surface where the rise and fall motion of the cutter will be normal to the surface being generated, and where in and out motion of the cutter is also provided. Since the cam means for controlling rise and fall and in and out movement of the cutters are mounted to move with a cradle plate capable of selected rotation, these two-dimensional movements may be controlled in constant angular relationship to the spar regardless of the angle through which the cradle plate is rotated. It should be particularly noted that each of the movements, that is, rise and fall, in and out, and rotation are independently controlled. Furthermore, the particular arrangement of helical cam means and drive therefor provides positive controlling action of the cutters while providing a removable packaged cam template which may be readily interchanged and stored without disturbing the selected contour of the cam edge. The tremendous reduction in change over time greatly increases the ratio of cutting time to idle time and obviously results in greater production and decreased costs.

All modifications and changes coming within the scope of the appended claims are embraced thereby.

I claim:

1. In a spar milling machine adapted to mill a twisted surface while maintaining each of a plurality of cutters movable in virtually perpendicularly related paths, one of said paths being along the axis of rotation of the cutter, the provision of: a self-propelled carriage; relatively movable means on said carriage for mounting each cutter for independent variable movement in a plane along angularly related paths of travel and for turning movement in said plane about an axis perpendicular thereto while maintaining the cutter movement along the angularly related paths of travel, said relatively movable means including a milling head for each cutter, a sleeve block carrying each milling head for movement thereon along one path of travel, a cradle plate carrying slidably said sleeve blocks in spaced relation for movement thereon along the other angularly related path of travel; and means for mounting the cradle plate for rotation on said carriage.

2. In a milling machine including a carriage movable along a bed the provision of: means for mounting a cutter for independently variable reciprocal movement along each of two angularly related paths of travel, one of said paths being along the axis of rotation of said cutter, and means connecting said carriage and said mounting means for turning movement of the mounting means about the axis of advancement of the carriage, said mounting means including members independently movable relative to each other along said angularly related paths of travel during turning movement of the mounting means.

3. In a milling machine including a fixed bed and a carriage movable along said bed, the combination of: at least one pair of cutters; means for mounting said pair of cutters for reciprocal relative movement along paths in the direction of the axis of rotation of said cutters and independently variably movable along paths angularly related to the axis of rotation of said cutters, said relative movement along said paths being in a plane transverse to the direction of advancement of said carriage; and cooperable cam and follower means supported on said carriage and movable therewith for controlling the independent variable movement of said cutters during advancement of the carriage.

4. In a spar milling machine having a rigid bed provided with longitudinal ways thereon and adapted to support a workpiece fixed thereto, a carriage movable along said ways, and drive means for said carriage, the combination of: a partially circular way provided on an end face of said carriage; cutter mounting means carried on said partially circular way comprising (a) a cradle plate slidably engaging said circular way for rotatable movement thereon about an axis of the workpiece, (b) a sleeve block slidably mounted on said cradle plate and reciprocally movable in a plane perpendicular to the axis of the workpiece, (c) and a milling head slidably mounted on said sleeve block and reciprocally movable along a path lying at right angles to the movement of the sleeve block; said cradle plate, sleeve block and milling head being independently movable relative to each other; a plurality of cooperable cam and follower means supported by the cutter mounting means to control movement of the sleeve block and milling head, the cam means controlling movement of the sleeve block including a cam template member carried by said cradle plate and the cam means controlling movement of the milling head including a cam template member carried by the sleeve block; each of the said cam template members having a continuous helical outer cam edge virtually equivalent to the length of said workpiece, a drum carrying each template member, a hub on each drum provided with an internally threaded portion coaxial to the template member, a threaded nonrotatable shaft for engaging the threaded portion of each hub, the shaft associated with the template member controlling movement of the sleeve block being supported from the cradle plate and the shaft associated with the template member for controlling movement of the milling head being supported by the sleeve block; each cooperable cam and follower means including cam followers mounted on said milling head and said sleeve block for cooperably engaging the cam edges of the template members mounted on said sleeve block and said cradle plate, means responsive to said cam followers and connected respectively to said milling head and sleeve block for causing independent movement thereof; and means operably connected to the carriage drive means and to said hubs for driving each cam template member along each threaded nonrotatable shaft.

5. In a spar milling machine having a rigid bed provided with longitudinal ways thereon and adapted to support a workpiece fixed thereto, a carriage movable along said ways, and drive means for said carriage, the combination of: a partially circular way provided on an end face of said carriage; cutter mounting means carried on said partially circular way comprising (a) a cradle plate member slidably engaging said circular way for rotatable movement thereon about an axis of the workpiece, (b) a sleeve block member slidably mounted on said cradle plate member and reciprocally movable in a plane perpendicular to the axis of the workpiece, (c) and a milling head member slidably mounted on said sleeve block member and reciprocally movable along a path lying at right angles to the movement of the sleeve block member; said cradle plate member, sleeve block member and milling head member being independently movable relative to each other; a plurality of cooperable cam and follower means carried by the cutter mounting means and the carriage for controlling independent movement of said cradle plate, said sleeve block and said milling head, each cooperable cam and follower means comprising a cam template member having a continuous helical outer cam edge, a threaded nonrotatable shaft, means for supporting said cam template member on said nonrotatable shaft for axial and rotatable movement of the cam member therealong, a cam follower cooperably engaging said cam edge and operatively connected to the cutter mounting member to be moved in response to changes in contour of said cam edge; and means operably connected to the carriage drive means and to said support means for each cam template member for driving said template members.

6. In a spar milling machine having a rigid bed provided with longitudinal ways thereon and adapted to support a workpiece fixed thereto, a carriage movable along said ways, and drive means for said carriage, the combination of: a partially circular way provided on an end face of said carriage; cutter mounting means carried on said partially circular way comprising (a) a cradle plate member slidably engaging said circular way for rotatable movement thereon about an axis of the workpiece, (b) a sleeve block member slidably mounted on said cradle plate member and reciprocally movable in a plane perpendicular to the axis of the workpiece, (c) and a milling head member slidably mounted on said sleeve block member and reciprocally movable along a path lying at right angles to the movement of the sleeve block member; said cradle plate member, sleeve block member and milling head member being independently movable relative to each other; a plurality of cooperable cam and follower means supported from said cutter mounting means and carriage for independently controlling the movements of the sleeve block member, the milling head member and the cradle plate member, each of said cooperable cam and follower means comprising a cam template member having a continuous helical outer cam edge, means for supporting said template member for axial and rotatable movement, a cam follower cooperable with said cam edge and operatively connected to one of the cutter mounting means members; and means operably connected to the carriage drive means and to said support means for said template members for driving said template members.

7. In a spar milling machine having a rigid bed provided with longitudinal ways thereon and adapted to support a workpiece fixed to said bed, a carriage movable along said ways, and drive means for the carriage, the combination of: relatively movable cutter mounting members carried on said carriage comprising a cradle plate member slidably supported on said carriage; a sleeve block member slidably mounted on said cradle plate member for reciprocal movement in a plane transverse to the axis of the workpiece, a milling head member slidably mounted on said sleeve block for reciprocal movement along a path in said transverse plane angularly related to the movement of the sleeve block; cooperable cam and follower means for each cutter mounting member for independently controlling the movements of the sleeve block member, the milling head member and the cradle plate member, each cooperable cam and follower means including a cam template member having a continuous helical outer cam edge, a cam follower cooperable with said cam edge and operatively connected to the cutter mounting member to be controlled by said cam template member; and means operably connected to the carriage drive means and to each cam template member for driving said template members.

8. In a milling machine for supporting a workpiece in fixed relation and having a carriage movable along said workpiece, said carriage carrying milling cutters, the combination of: relatively movable members including a sleeve block member and a milling head member for mounting each cutter for in and out and up and down movement independently of the other cutter; means for carrying said sleeve block member and milling head member including a cradle plate mounted for rotatable movement upon said carriage about an axis virtually coincident to an axis of the workpiece; and cooperable means on said sleeve block member and milling head member and on said sleeve block member and cradle plate member for controlling in and out and up and down movement of said cutters, each cooperable means including a cam template having a continuous helical cam edge and a cam follower cooperable with said cam edge and operatively connected to the relatively movable member to be controlled by said cam template; and drive means connected to said cam template for positioning said template in correlation to the advancement of the carriage along said workpiece.

9. In a milling machine having a self-propelled carriage movable along a bed and cutting means movably mounted on the carriage, the combination of: means on said carriage for controlling relative movement of the cutting means in a plurality of paths of travel including a unitary cam template means provided with a helical cam edge for controlling movement along a selected path; means for moving said template means axially and rotatably in correlation with movement of said carriage including a hub provided with external teeth extending along the length thereof for a distance approximately the length of said cam template means; and a cam follower held against said axial and rotatable movement of the template means and cooperably engaging said cam edge, said follower being operatively connected to said cutting means.

10. A milling machine as claimed in claim 9 wherein a drum supports said cam template means and is removably connected thereto.

11. In a milling machine including a movably mounted cutter, the provision of: a movable carriage; means for mounting a cutter on said carriage for reciprocal independent movement along each of two perpendicularly related paths; and means for carrying said mounting means on said carriage for rotatable movement thereof about the axis of advancement of said carriage, said mounting means including relatively movable members supported from the carrying means and slidably mounted relative to each other and to said carrying means whereby said perpendicular relationship of said paths is maintained during rotatable movement.

12. In a milling machine, the combination of: a bed; a carriage mounted for movement along said bed; a pair of spaced normally juxtaposed cutters; means on the carriage for rotating said cutters about a longitudinal axis of a workpiece carried by the bed; means supported from the carriage for moving said cutters toward each other and up and down relative to each other; and means supported from said carriage and movable therewith for selectively and individually controlling movement of said pair of cutters towards and away from each other, up and down with respect to each other, and movement of the cutters about said longitudinal axis during advancement of the carriage.

13. In a milling machine, the combination of: a bed; a carriage mounted for movement along said bed; a pair of spaced juxtaposed cutters; means supported from the carriage for moving said pair of cutters towards and away from other other, and up and down each with respect to the other; and means supported from the carriage and movable therewith for controlling said movements in response to longitudinal motion of the carriage.

14. In a milling machine, the combination of: a bed; a carriage mounted for movement along said bed; a cutter; means on the carriage for rotating said cutter about a longitudinal axis of a workpiece carried by the bed; means supported from the carriage for moving said cutter in and out with respect to said axis and up and down with respect to said axis; and means supported from the carriage and movable therewith for selectively and individually controlling said movements of said cutter in response to longitudinal motion of the carriage.

15. In a milling machine for supporting a workpiece in fixed relation and having a carriage movable along said workpiece, said carriage carrying milling cutters, the provision of: relatively movable means including a sleeve block and a milling head for mounting a cutter for in and out and up and down movement; means for carrying said relatively movable means including a cradle plate mounted for movement about an axis and upon said carriage; and cooperable cam and follower means supported from said milling head and sleeve block and from said sleeve block and cradle plate for controlling movements of the relatively movable means and of the cutter, each cooperable means including a cam template having a continuous helical cam edge, a cam follower cooperable with said cam edge, and drive means for rotating and axially moving each cam template in response to longitudinal motion of the carriage along said workpiece.

16. A milling machine as claimed in claim 15 wherein the helical template is carried by a cylindrical member and means are provided for removably mounting said template and cylindrical member as a unit.

17. A milling machine as claimed in claim 15 wherein said means for carrying said relatively movable means includes a partially circular way provided on a face of the carriage cooperable with said cradle plate.

18. In a spar milling machine adapted to mill a twisted surface while maintaining a cutter in virtually perpendicular relation to said surface, the provision of: a self propelled carriage; means including relatively movable members for mounting a cutter for movement in a plane along perpendicular paths of travel transverse to longitudinal movement of the carriage; means for carrying said mounting means on said carriage and relatively movable with respect to each of said members for turning movement about an axis perpendicular to said plane while maintaining cutter movement along the perpendicular paths of travel; cam means including a plurality of helical cam template means and cooperable cam follower means respectively supported upon the relatively movable members and said carrying means for independently controlling relative movements of the cutter; means for driving said carriage; and means on said carriage operably connecting said driving means and said plurality of cam template means for rotating and axially moving said template means in response to longitudinal motion of said carriage.

19. A machine as claimed in claim 18 wherein each helical cam template means is mounted as a unit and is removable without disturbing the configuration of the cam edge.

20. In a milling machine including a fixed bed and a carriage movable along said bed, the combination of: a milling cutter; means for mounting said milling cutter for reciprocal movement along a path in the direction of the axis of rotation of said cutter and in independently variable movement along a path perpendicularly related to the axis of rotation of said cutter, said movement along said paths being in a plane transverse to the direction of advancement of said carriage; and cooperable cam and follower means supported on said carriage and movable therewith for controlling the independent variable movement of said cutter in response to longitudinal motion of the carriage.

References Cited in the file of this patent
UNITED STATES PATENTS

| | | |
|---|---|---|
| 1,336,659 | Simmons | Apr. 13, 1920 |
| 1,674,484 | Scott et al. | June 19, 1928 |
| 1,974,919 | Harris et al. | Sept. 25, 1934 |
| 2,173,135 | Zimmermann | Sept. 19, 1939 |
| 2,239,927 | Morton | Apr. 29, 1941 |
| 2,312,355 | Oberhoffken | Mar. 2, 1943 |
| 2,341,194 | Schwartz et al. | Feb. 8, 1944 |
| 2,345,494 | Onsrud | Mar. 28, 1944 |
| 2,356,571 | Dewoitine | Aug. 22, 1944 |